United States Patent
Glover

(10) Patent No.: US 10,380,797 B2
(45) Date of Patent: *Aug. 13, 2019

(54) CONFIGURATION OF NAVIGATIONAL CONTROLS IN GEOMETRIC ENVIRONMENT

(71) Applicant: International Business Machines Corporation, Armonk, NY (US)

(72) Inventor: Raymond S. Glover, Saffron Walden (GB)

(73) Assignee: International Business Machines Corporation, Armonk, NY (US)

( * ) Notice: Subject to any disclaimer, the term of this patent is extended or adjusted under 35 U.S.C. 154(b) by 1163 days.

This patent is subject to a terminal disclaimer.

(21) Appl. No.: 14/087,123

(22) Filed: Nov. 22, 2013

(65) Prior Publication Data
US 2015/0145855 A1    May 28, 2015

(51) Int. Cl.
*G06T 19/00* (2011.01)
*G06T 17/10* (2006.01)
*G06T 17/30* (2006.01)
*G06F 3/01* (2006.01)
(Continued)

(52) U.S. Cl.
CPC ............ *G06T 19/003* (2013.01); *G06F 3/011* (2013.01); *G06F 3/04815* (2013.01); *G06T 7/62* (2017.01); *G06T 17/10* (2013.01); *G06T 17/30* (2013.01); *G06T 2219/2004* (2013.01); *G06T 2219/2016* (2013.01)

(58) Field of Classification Search
None
See application file for complete search history.

(56) References Cited

U.S. PATENT DOCUMENTS 5,276,785 A * 1/1994 Mackinlay .......... G06F 3/04815
                                                     345/427
8,334,867 B1  12/2012  Davidson
8,368,753 B2   2/2013  Zalewski
(Continued)

FOREIGN PATENT DOCUMENTS

WO    2007084647 A2    7/2007
WO    2010106525 A1    9/2010
WO    2013068860 A1    5/2013

OTHER PUBLICATIONS

Mackinlay et al., "Rapid controlled movement through a virtual 3D workspace", ACM SIGGRAPH Computer Graphics Homepage vol. 24 Issue 4, Aug. 1990 pp. 171-176, ACM New York, NY, USA.*
(Continued)

*Primary Examiner* — Saptarshi Mazumder
(74) *Attorney, Agent, or Firm* — Nicholas D. Bowman

(57) ABSTRACT

According to embodiments of the invention, methods, and a computer system for configuring navigational controls in a geometric environment are disclosed. The method may include obtaining a data set for geometric representation on a display, forming one or more reference surfaces, calculating a fit score and a confidence score using one or more of the reference surfaces, and configuring the navigational system to a control scheme when a computational operation on the fit score and the confidence score is outside of a threshold value. The control scheme may be a geometric control scheme, a planar control scheme, and a roaming control scheme.

12 Claims, 7 Drawing Sheets

(51) Int. Cl.
G06F 3/0481 (2013.01)
G06T 7/62 (2017.01)

(56) References Cited

U.S. PATENT DOCUMENTS

2003/0001837 A1* 1/2003 Baumberg .............. G06T 15/20
345/419
2010/0295849 A1* 11/2010 Chai ....................... G06T 17/20
345/420

OTHER PUBLICATIONS

Isenberg, T., "Position Paper: Touch Interaction in Scientific Visualization", Proceedings of the Workshop on Data Exploration on Interactive Surfaces (DEXIS Nov. 13, 2011, Kobe, Japan), pp. 24-27, INRIA, Le Chesnay, France, 2011, Dexis proceedings published as INRIA research report # RR-0421 in May 2012. http://www.cs.rug.nl/~isenberg/personal/papers/Isenberg_2011_TIS.pdf.

Isenberg et al., "Gestures vs. Postures: 'Gestural' Touch Interaction in 3D Environments", Proceedings of the CHI Workshop on "The 3rd Dimension of CHI: Touching and Designing 3D User Interfaces" (3DCHI May 5, 2012, Austin, TX, USA), pp. 53-61. http://tobias.isenberg.cc/personal/papers/Isenberg_2012)GPG.pdf.

Klein et al., "A Design Study of Direct-Touch Interaction for Exploratory 3D Scientific Visualization", Eurographics Conference on Visualization (EuroVis) 2012, vol. 31 (2012), No. 3, © 2012 The Author(s), © 2012 The Eurographics Association and Blackwell Publishing Ltd. http://vernier.frederic.free.fr/publis/klein_2012_DSD.pdf.

Yu et al., "FI3D: Direct-Touch Interaction for the Exploration of 3D Scientific Visualization Spaces", IEEE Transactions on Visualization and Computer Graphics, 16(6): 1613-1622, Nov./Dec. 2010. DOI: 10.1109/TVCG.2010.157 http://hal.inria.fr/docs/00/58/73/77/PDF/Yu_2010.FDT.pdf.

Yu et al., "Efficient Structure-Aware Selection Techniques for 3D Point Cloud Visualizations with 2DOF Input", IEEE Transactions on Visualization and Computer Graphics, 18(12): 2245-2254, Dec. 2012. DOI: 10.1109/TVCG.2012.217 http://tobias.isenberg.cc/personal/papers/Yu_2012_ESA.pdf.

Yu et al., "Efficient Structure-Aware Selection Techniques for 3D Point Cloud Visualizations with 2DOF Input", IEEE Transactions on Visualization and Computer Graphics, VisWeek 2012, Slideshow. http://tobias.isenberg.cc/personal/papers/Yu_2012_ESA_Slides.pdf.

Glover, R., "Configuration of Navigational Controls in Geometric Environment," U.S. Appl. No. 14/841,742, filed Sep. 1, 2015.

Wikipedia, "Rotating calipers", From Wikipedia, the free encyclopedia, last edited on Dec. 6, 2018, 7 pages.

Mish, "Can someone explain the rotating calipers to me?", stackoverflow, edited Dec. 7, 2012, printed Dec. 20, 2018, 4 pages, https://stackoverflow.com/questions/13765200/can-someone-explain-the-rotating-calipers-to-me.

Geometric Tools, LLC, Distributed under the Boost Software License, Version 1.0, File Version 5.0.1, Oct. 1, 2010 6 pages, https://web.archive.org/web/20130622102820/http://www.geometrictools.com/LibMathematics/Containment/Wm5ContMinBox2.cpp.

* cited by examiner

CONFIGURATION OF NAVIGATIONAL CONTROLS IN GEOMETRIC ENVIRONMENT

BACKGROUND

The present disclosure relates to the field of configuring user interfaces. More specifically, the present disclosure relates to a method of configuring a user interface movement controls for a synthetic camera.

In general, for a software application designed for visualizing a geometric representation of data, it may be sufficient to represent data in either two dimensions or three dimensions. A user may navigate a geometric representation of data using user controlled movement controls for a synthetic camera. When data can be represented in both two and three dimensions, the need to efficiently navigate geometric representations of data and the need to configure controls depending upon the geometric representation increases.

SUMMARY

The present disclosure relates to a method of configuring a navigational system in a geometric environment. A method of controlling a navigational system may include obtaining a data set for geometric representation on a display, the data set may have data points, forming one or more reference surfaces, calculating a fit score and a confidence score using one or more of the reference surfaces, and configuring the navigational system to a control scheme when a computational operation on the fit score and the confidence score is outside of a threshold value. The one or more reference surfaces may be formed such that the reference surfaces have one or more of the data points as vertices.

The fit score may be a geometric fit score, the confidence score may be a geometric confidence score, and the control scheme may be a geometric control scheme. The navigational system may be configured to a geometric control scheme when a computational operation on the geometric fit score and the geometric confidence score is greater than or equal to a threshold value. The geometric fit score may be calculated at least by determining if the one or more reference surfaces are positioned such that one or more reference lines, normal to each of the one or more reference surfaces, approach an intersection. The geometric confidence score may be calculated at least by the number of the one or more reference lines which approach the intersection.

The method of controlling a navigational system may further include calculating, when the computational operation of the geometric fit score and the geometric confidence score is less than the threshold value, a planar fit score and a planar confidence score using at least one or more of the reference surfaces, and configuring the navigational system to a planar control scheme when a computational operation of the planar fit score and the planar confidence score is greater than or equal to the threshold value. The planar fit score may be calculated at least by forming a reference prism encapsulating one or more data points, the reference prism having a reference face and determining the area of the reference face in proportion to other faces of the reference prism. The planar confidence score may be calculated at least by the number of the one or more data points which are encapsulated in the reference prism.

The method of controlling a navigational system may further include configuring, if the computational operation of the planar fit score and the planar confidence score is less than the threshold value, the navigational system to a roaming control scheme. The method may further include capturing one or more of the data points in view of a synthetic camera, wherein the one or more reference surfaces are formed such that the reference surfaces have the captured data points as vertices. The captured data points may reflect the view of the synthetic camera in real time.

A computer system may include a processor, an input device, an output device, and memory communicatively coupled to the processor, wherein the memory is encoded with instructions, and wherein the instructions when executed on the processor include obtaining a data set for geometric representation on the output device, the data set having data points, forming one or more reference surfaces, the one or more reference surfaces formed such that the reference surfaces have one or more of the data points as vertices, calculating a fit score and a confidence score using one or more of the reference surfaces, and configuring the input device to a control scheme when a computational operation on the fit score and the confidence score is outside of a threshold value.

The fit score may be a geometric fit score, the confidence score may be a geometric confidence score, and the control scheme may be a geometric control scheme. The input device may be configured to a geometric control scheme when a computational operation on the geometric fit score and the geometric confidence score is greater than or equal to a threshold value. The geometric fit score may be calculated at least by determining if the one or more reference surfaces are positioned such that one or more reference lines, normal to each of the one or more reference surfaces, approach an intersection. The geometric confidence score may be calculated at least by the number of the one or more reference lines which approach the intersection.

The computer system may have instructions which may further include calculating, when the computational operation of the geometric fit score and the geometric confidence score is less than the threshold value, a planar fit score and a planar confidence score using at least one or more of the reference surfaces, and configuring the input device to a planar control scheme when a computational operation of the planar fit score and the planar confidence score is greater than or equal to the threshold value. The planar fit score may be calculated at least by forming a reference prism encapsulating one or more data points, the reference prism having a reference face and determining the area of the reference face in proportion to other faces of the reference prism. The planar confidence score may be calculated at least by the number of the one or more data points which are encapsulated in the reference prism.

The computer system may have instructions which may further include configuring, if the computational operation of the planar fit score and the planar confidence score is less than the threshold value, the input device to a roaming control scheme. The computer system may further include capturing one or more of the data points in view of a synthetic camera, wherein the one or more reference surfaces are formed such that the reference surfaces have the captured data points as vertices. The captured data points may reflect the view of the synthetic camera in real time.

DETAILED DESCRIPTION

In the following description, reference is made to the accompanying drawings which by way of illustration various examples by which the disclosure may be used. Other examples of the disclosure may be used, as structural and operational changes may be made without departing from the scope of the present disclosure.

While the same nomenclature and same numbers may be used to identify elements throughout the disclosure, this practice is not intended to limit the scope of the disclosure. Identified elements in one figure may not be identical to other same named or identified elements in other figures.

The present disclosure relates to a method of configuring a navigational system in a geometric environment. Specifically the present disclosure relates to a method of providing a control scheme for representing user inputs, the control scheme provided depending upon the position of the synthetic camera and the data in view of the synthetic camera in a geometric environment.

Figure 1:
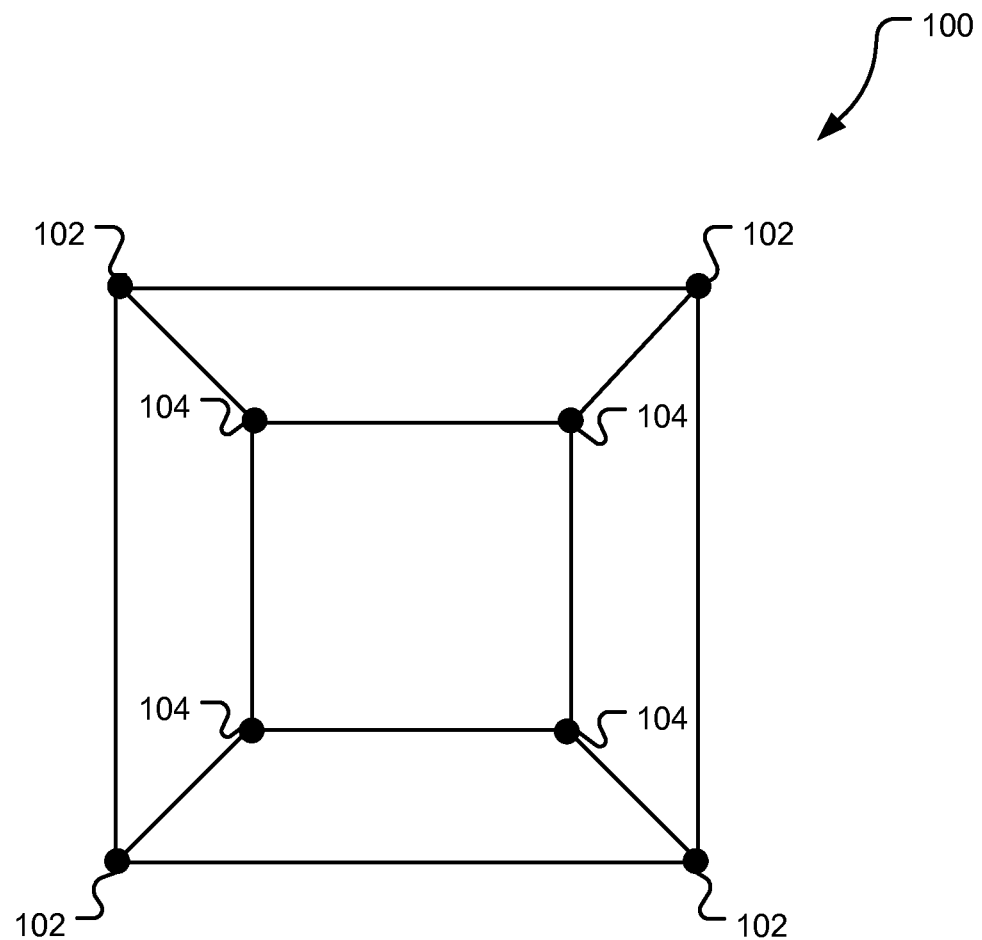
FIG. 1 depicts an image of an example data set in a geometric environment.

Referring to FIG. 1, a data set 100 having data points 102, 104 represented in a geometric environment may be seen. Effectively viewing the data set 100 in the geometric environment may depend upon the arrangement of the data points 102, 104. For example, the data points 102, 104 may be arranged in a keyboard shape where the inner four data points 104 are located on a separate plane from the outer data points 102 such that the inner data points 104 are projected up and away from the outer data points 104. In contrast, the data points 102, 104 may be arranged on the same plane. Efficiently navigating the geometric environment and viewing the data set may depend upon how the data points 102, 104 are arranged in the environment.

A navigational system may assess the arrangement of the data set 100 in the environment and select a control scheme for navigating that environment. A navigational system may attempt to match the points to a fit score and a confidence score for various control schemes using a confidence and fit calculation. If the system detects a point arrangement which results in a fit and confidence above a threshold, then the system may select the control scheme associated with that fit and confidence calculation. If no control scheme is matched then a default control scheme may be selected.

Interactive data representations, including geometric representation of data in a geometric environment, may be useful in a variety of applications. A data in a geometric environment may be arranged in two or three dimensions. For data representations including meshes, networks, point data, or other types of data sets, a general purpose software application may adopt a control scheme for navigational characteristics of a synthetic camera in the geometric environment in order to more efficiently view the data set. The synthetic camera may be a virtual representation of a camera positioned in the geometric environment which may be moved and oriented in the geometric environment. The synthetic camera may produce an image of the geometric environment which is produced on a display. The synthetic camera may allow a user to view the geometric representation of data. The movement and control over the synthetic camera in the geometric environment may be automated or controlled manually. Manual control over the synthetic camera may apply user inputs which control movement including but not limited to panning, rotation, pitch, and zoom. The control scheme may designate the navigational control associated with various user inputs.

The control scheme used may depend upon the position of the synthetic camera in relation to the data and the data which is in view of the synthetic camera. For example, when viewing a top down view of an arrangement of points on a plane, a control scheme may be used which pans the synthetic camera in two dimensions parallel to the plane and may zoom in and out towards the arrangement of points. However, when viewing a top down view of a spherical polygon mesh, for example, a control scheme may be used which rotates around the center of the polygon mesh and may zoom in and out towards the surface of the polygon mesh.

The control scheme may be selected depending upon the efficiency of the control scheme in navigating and viewing the data. The efficiency of the control scheme may be determined by fitting the characteristics of a control scheme to the geometric data representation. In an embodiment, predefined control schemes may be used including but not limited to a geometric control scheme, a planar control scheme, and a roaming control scheme. In an embodiment, the geometric control scheme may rotate the synthetic camera around a center of rotation and may allow for zooming motion towards and away from the center of rotation. The planar control scheme may pan the synthetic camera in two dimensions parallel to the synthetic camera's view plane and may allow for zooming motion towards and away from the view plane. The roaming control scheme may allow for panning, rotation, and zoom.

Determining a control scheme may be accomplished by calculating a fit score and confidence score for a specific control scheme for a data set or data subset used for geometric representation. When a computational operation of the fit score and the confidence score reach a threshold value, the control scheme being fitted may be selected. If the fit score and a confidence score do not reach a threshold value, another type of control scheme may be selected, or a default control scheme may be selected. The data set or data subset may be iteratively configured to various control schemes until the fit score and the confidence score of a control scheme reach a threshold value, or until a maximum number of configuring iterations is reached and a default control scheme is selected.

The method of controlling the navigational system may include obtaining a data set having data points, forming one or more reference surfaces, calculating a geometric fit score and a geometric confidence score using at least one or more of the reference surfaces, and configuring the navigational system to a geometric control scheme if an operation of the geometric fit score and the geometric confidence score is greater than or equal to a threshold value. The method may further include, if the operation of the geometric fit score and the geometric confidence score is less than the threshold value, calculating a planar fit score and a planar confidence score using at least one or more of the reference surfaces. The navigational system may be configured to a planar control scheme if an operation of the planar fit score and the planar confidence score is greater than or equal to the threshold value. The method may further include, if the operation of the planar fit score and the planar confidence score is less than the threshold value, configuring the navigational system to a roaming control scheme.

Figure 2:
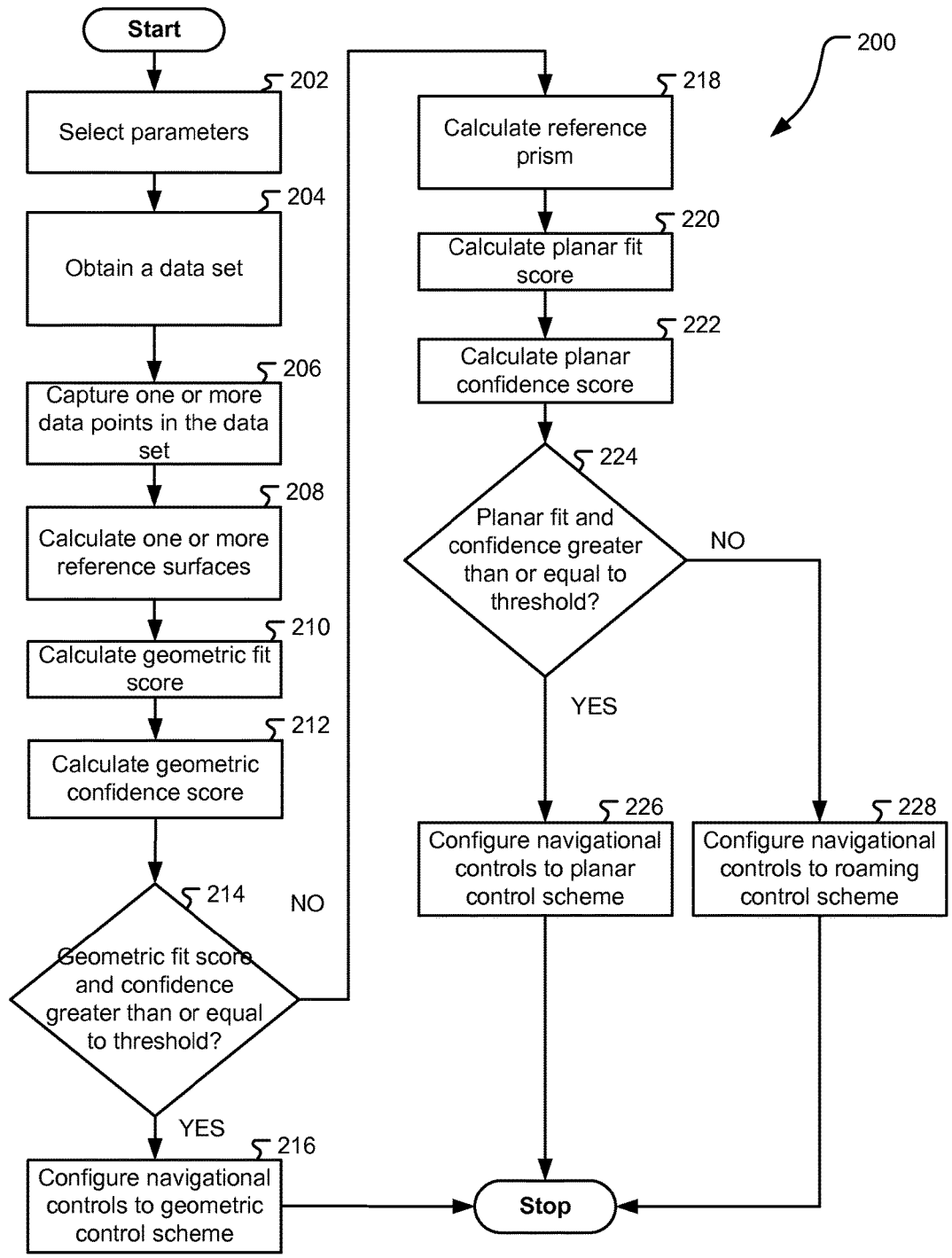
FIG. 2 depicts a flow diagram of an embodiment of a method of configuring a navigational system to a geometric control scheme, a planar control scheme, or a roaming control scheme.

Referring now to FIG. 2 an embodiment of a method 200 of configuring a control scheme for a navigational system can be seen. In operation 202 user parameters may be selected. The operation 202 of selecting user parameters may include selecting a number of fitting iterations, selecting a threshold value, selecting control schemes to be fitted, selecting the order of fitting control schemes, selecting a default control scheme, and selecting other user defined parameters.

In this embodiment, the method 200 may use an iterative approach to fitting a control scheme to data points. The number of fitting iterations selected may determine the number of attempts to fit the data points to available control schemes. For example, where the number of fitting iterations is selected as two and there are two or more available control schemes, two attempts to fit the control schemes data set or subset may be made. The selected number of fitting iterations may also determine when the method selects a default classification. In an embodiment, the number of fitting iterations may be selected as two, such that after two attempts to fit a control scheme to a data set or subset, if no control scheme is fitted, then a default control scheme is applied.

A threshold value may be used with a computational operation of the fit score and a confidence score, described further below, and determined at least in operations 210, 212, 220 and 222, so that when the computational operation is outside of the threshold value the navigation system may be configured. In an embodiment, the fit score, confidence score, and the threshold value may be selected to be a value between zero and one. In an embodiment the threshold may be selected to be a value of 0.5, and when an operation of the fit score and confidence score is greater than or equal to 0.5 the threshold value is reached and the control scheme corresponding to the fit and confidence calculation may be selected.

Various types of control schemes for navigation systems may also be selected. The selected control schemes selected may be fitted to the data or data set. In FIG. 2, the control schemes selected include a geometric control scheme, a planar control scheme, and a roaming control scheme. However, other various types of control schemes may also be selected. The order of fitting the control scheme may also be selected. In FIG. 2, the order of fitting is first, fitting to a geometric control scheme and second, fitting to a planar control scheme. The default control scheme may also be selected. In FIG. 2, the default control scheme selected is the roaming control scheme.

In operation 204 a data set may be obtained. The data set may have data points. The data points may be for geometric representations. The geometric representations may include polygon meshes, volumetric meshes, structures, networks, point clouds, or other types of geometric representations. The data points may be obtained from various sources including local or external sources, a database, via a data stream, or other sources of data. The data set may also be a subset of a larger data set.

In operation 206, one or more of the data points may be captured. Capturing one or more of the data points may create a subset of the data set which may be used in conjunction with operation 208, described further below, to calculate one or more reference surfaces. Various portions of the data set may be captured. The data points may be captured by various means including, manual selection or automated selection. In an embodiment, the data points which are in view of a synthetic camera may be automatically captured. The captured data points may be a subset of the data set. The subset of the data points may be updated in real time to include only the data points in view of the synthetic camera.

In operation 208, one or more reference surfaces may be calculated. The reference surfaces may be used in an embodiment, in conjunction with operations 210 and 212 to calculate the fit score and the confidence score of the geometric control scheme. The reference surfaces may be formed by connecting each of the data points together with one or more rays, which may create planar areas having one or more data points as vertices. The planar areas may be used as reference surfaces. In an embodiment, the data points used to form the one or more reference surfaces may be the captured data points. In an embodiment, discussed further below, the one or more reference surfaces may be used to calculate the geometric fit score and the geometric confidence score by determining whether one or more reference lines intersect or approach an intersection.

In operations 210 and 212 a geometric fit score and a geometric confidence score may be calculated. The geometric fit score and the geometric confidence score may be generally used to identify when a synthetic camera may orient to and rotate around a center of rotation positioned in the geometric representation of the data set. The geometric fit score and geometric confidence score may be calculated in various ways, including applying Bayesian statistics, or other methods of statistics which can calculate the location and confidence in the location of the center of rotation for a data set for a geometric representation.

In operation 210, the geometric fit score may be the extent to which the center of rotation can be located. The center of rotation may allow the synthetic camera to be directed to move in the geometric environment while keeping the data set in view. In an embodiment, in the geometric control scheme, the synthetic camera may be oriented towards the center of rotation and rotate around the center of rotation to view the data points in the geometric environment. The geometric fit score may identify a location of the center of rotation using the data points. In an embodiment, the geometric fit score may locate the center of rotation by forming one or more reference surfaces, described further below, and determining whether one or more reference lines, normal to the one or more reference surfaces intersect or approach intersection together at a point of intersection.

For reference lines which approach intersection together, the average distance of the reference lines from the point of intersect may be used to locate the center of rotation. In an embodiment, the median distance of the reference lines from the point of intersect may be used to locate the center of rotation. In an embodiment, for calculation of the geometric fit score, a least square error approach may be used to identify the point of intersection closest to all reference lines. However, other methods of calculating a fit score and a confidence score known to one skilled in the art may be used to the same or similar effect.

In operation 212, the geometric confidence score may be the extent of certainty in the location of the center of rotation. In an embodiment discussed further below, the geometric confidence score may be calculated by at least determining the quantity of one or more reference lines, normal to one or more reference surfaces, which intersect or are approaching intersection at an intersection point. In an embodiment, for calculation of confidence score, a least square error approach may be used to identify the point of intersection closest to all reference lines. However, other methods of calculating a confidence score known to one skilled in the art may be used to the same or similar effect.

If a computational operation on the geometrical fit score and the geometrical confidence score generates a value which is outside of a threshold value then, in operation 214, the navigational system may be configured to the geometric control scheme in operation 216. The computational operation used may vary depending upon the method of fitting the data points to a classification. In an embodiment the computational operation may be the product of the fit score and the confidence score. In another embodiment, the computational operation may be the addition of the fit score and the confidence score. However other types of computational operations may be used to the same or similar effect.

If the computational operation on the geometrical fit score and the geometrical confidence is less than the threshold value then, in operation 214, operation 218 may begin and a reference prism may be calculated. The reference prism may be used in conjunction with operations 220 and 222 to calculate the fit score and the confidence score of a planar control scheme. The reference prism may be a computer generated calculation tool which encloses the one or more of the data points and may have one or more of the data points as vertices. The reference prism may be used in to find a geometric fit score by determining whether the data points are arranged such that a prism with the least volume needed to enclose the data points produces a planar face which is larger in proportion to other faces of the reference prism. The reference prism may be formed by projecting a rectangular prism into the data set in the geometric environment and orienting the reference prism such that the volume of the reference prism is minimized as it encapsulates one or more of the data points. In an embodiment, the data points may be the vertices of the reference prism such that the reference prism is substantially a plane. In an embodiment, the data points used to form the reference prism may be the captured data points.

In operations 220 and 222, the planar fit score and the planar confidence score may be calculated. The planar fit score and the planar confidence score may be generally used to calculate whether the data set is positioned such that the data points are located approximately on a common plane. In operation 220, the planar fit score may be the extent to which the common plane can be located. The common plane may allow the synthetic camera to be directed to move in the geometric environment while keeping the data set in view. In an embodiment, in the planar control scheme, the synthetic camera may be oriented towards the common plane and move in two dimensions parallel to the common plane to view the data points in the geometric environment.

The planar fit score may identify a location of the common plane using the data points. In an embodiment, the planar fit score may locate the common plane by forming a reference prism, described further below, which encloses the data points and determining whether a reference face of the reference prism has an area greater than other faces of the reference prism. The planar fit score may be calculated in various ways including applying Bayesian statistics or other methods of statistics which can identify a common plane for one or more of the data points. Other methods of calculating a fit score for identifying a common plane known to one skilled in the art may be used to the same or similar effect.

In operation 222, the planar confidence score may be the extent of certainty in the accuracy of the location of the common plane. In an embodiment discussed further below, the planar confidence score may be calculated by at least determining the quantity of data points enclosed in a reference prism. The planar confidence score may be calculated in various ways including applying Bayesian statistics or other methods of statistics which can identify a common plane for one or more of the data points. Other methods of calculating a confidence score of identifying a common plane known to one skilled in the art may be used to the same or similar effect.

If a computational operation on the planar fit score and the planar confidence is greater than or equal to the threshold value then, in operation 224, the navigational system may be configured to a planar control scheme in operation 226. If the computational operation of the geometrical fit score and the geometrical confidence is less than the threshold value then, in operation 228, the default control scheme may be selected and the navigational system may be configured to the roaming control scheme. In an embodiment the computational operation may be the product of the fit score and the confidence score. In another embodiment, the computational operation may be the addition of the fit score and the confidence score.

Figure 3:
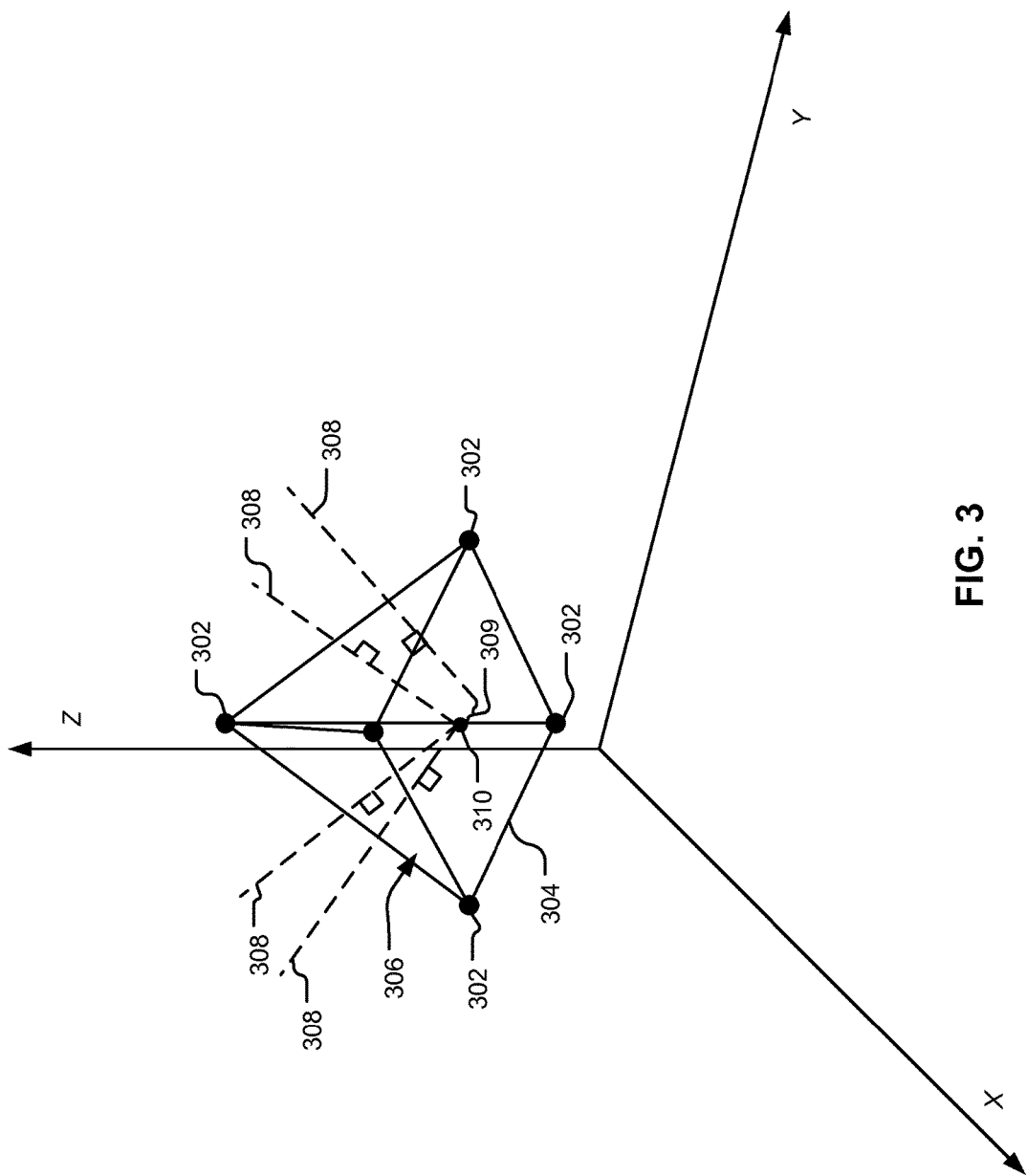
FIG. 3 depicts an image of a data set in a geometric environment having one or more reference surfaces and one or more reference lines, normal to the one or more reference surfaces intersecting or approaching intersection.

Referring now to FIG. 3, an embodiment can be seen showing an embodiment of operations 208, 210, and 212. Data points 302 may be seen having one or more rays 304 connecting the data points to form one or more reference surfaces 306. The one or more reference surfaces 306 may be planar areas bordered by one or more rays 304, with one or more data points 302 as vertices.

In this embodiment, the geometric fit score may be calculated by determining whether the one or more reference surfaces 306 are positioned such that one or more reference lines 308, normal to each of the one or more reference surfaces 306, intersect or approach intersection at an intersection point 310. The geometric confidence score may be calculated by at least determining the number of the one or more reference lines 308 which intersect or approach intersection at an intersection point 310. Reference lines 308 which approach intersection 310 may lie within a distance 309 which is within a margin of error. In an embodiment, if the distance 309 of a reference line 308 approaching intersection is within 5% of the distance of a synthetic camera from the intersection point 310, then the reference line 308 is considered to approach intersection. The one or more reference surfaces 306 may be updated in real time depending on the data points 302 in view of a synthetic camera.

The one or more reference lines 308 which intersect may increase the fit score for the geometric control scheme. The more reference lines 308 which approach intersection and the closer the distance 309 from the point of intersection 310 the greater the increase in the fit score may be. In an embodiment, the geometric fit score may be normalized within a range from a value of zero to one, where zero means there is no fit to the geometric control scheme and where one means there is one hundred percent fit to the geometric control scheme. The geometric confidence score may be calculated by the number of the reference lines 308 used to calculate the geometric fit score. The greater the number of reference lines 308 used the greater the increase in the geometric confidence score may be. In an embodiment, the geometric confidence score may be normalized within a range from zero to one, where zero means there is no confidence in the fit and where one means there is one hundred percent confidence.

Figure 4:
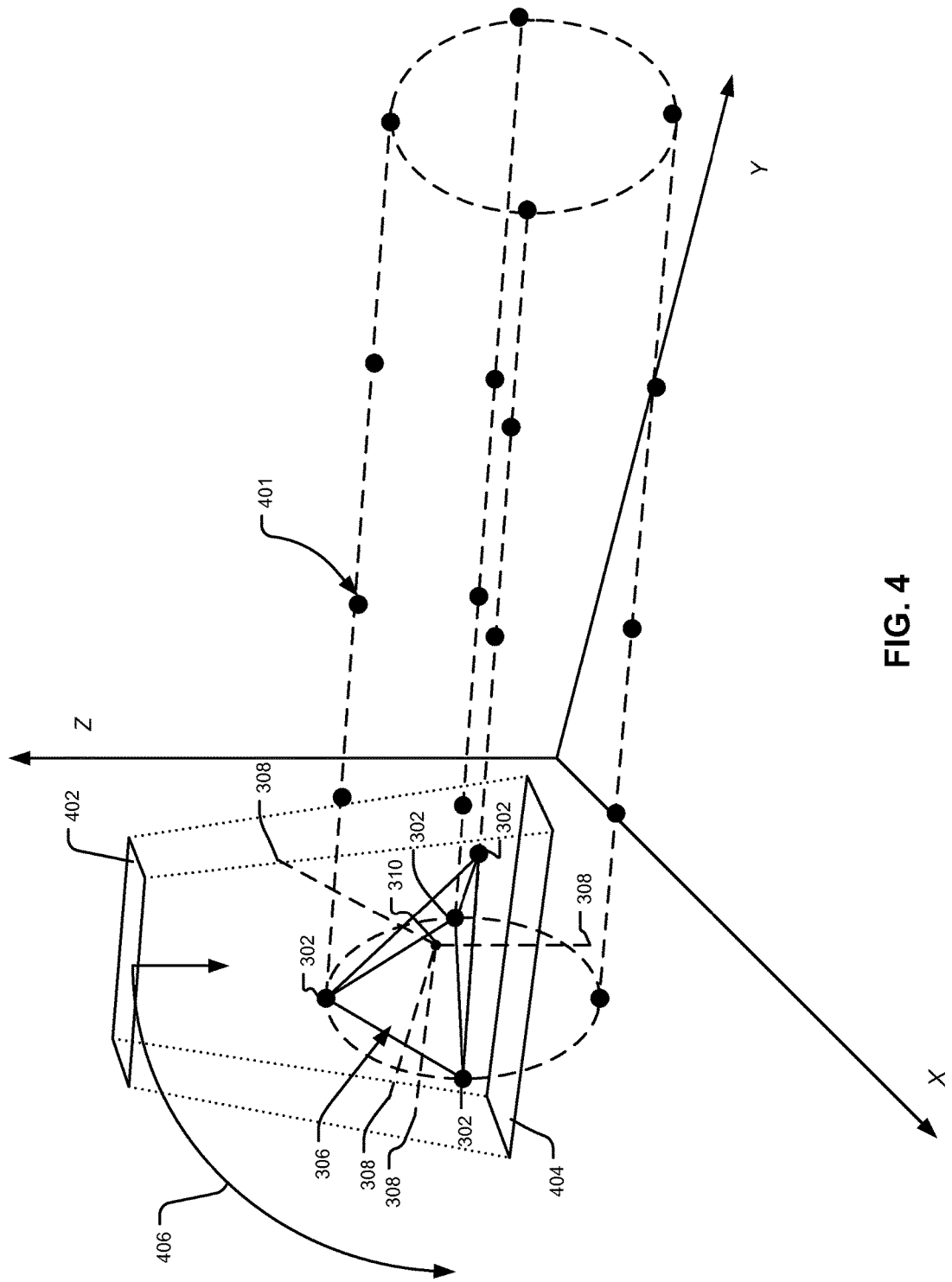
FIG. 4 depicts an image of a data set in a geometric environment having a reference prism enclosing the data set.

Referring now to FIG. 4, another embodiment of operations 208, 210, and 212 may be seen. In the embodiment, a data set 401 and a synthetic camera 402 may be seen. The data set 401 may be used for a geometric representation. The synthetic camera may be oriented with a view plane 404 such that data points 302 are in view of the synthetic camera 402. The data points 302 in view of the synthetic camera 402 may be captured, and one or more rays may connect the data points 302 to create one or more reference surfaces 306. The data points 302 may be automatically captured when in the view plane 404 of the synthetic camera 402. The data points 302 may also be updated in real time to include only the data points 302 which are currently in the view plane 404 of the synthetic camera 402.

In this embodiment, the geometric fit score may be calculated in the same or substantially similar manner as in FIG. 3, by determining whether the one or more reference surfaces 306 are positioned such that one or more reference lines 308, which are normal to each of the one or more reference surfaces 306, intersect or approach intersection at an intersection point 310. However in this embodiment, the calculation of geometric fit score and the geometric confidence score may be made with regard to only the data points 302 which are in view of the synthetic camera 402. If the computational operation of the geometric fit score and the geometric confidence score is greater than or equal to the threshold value, then the geometric control scheme may be applied and the synthetic camera 402 may orient to the intersection point 310 and rotate around along a path 406.

Figure 5:
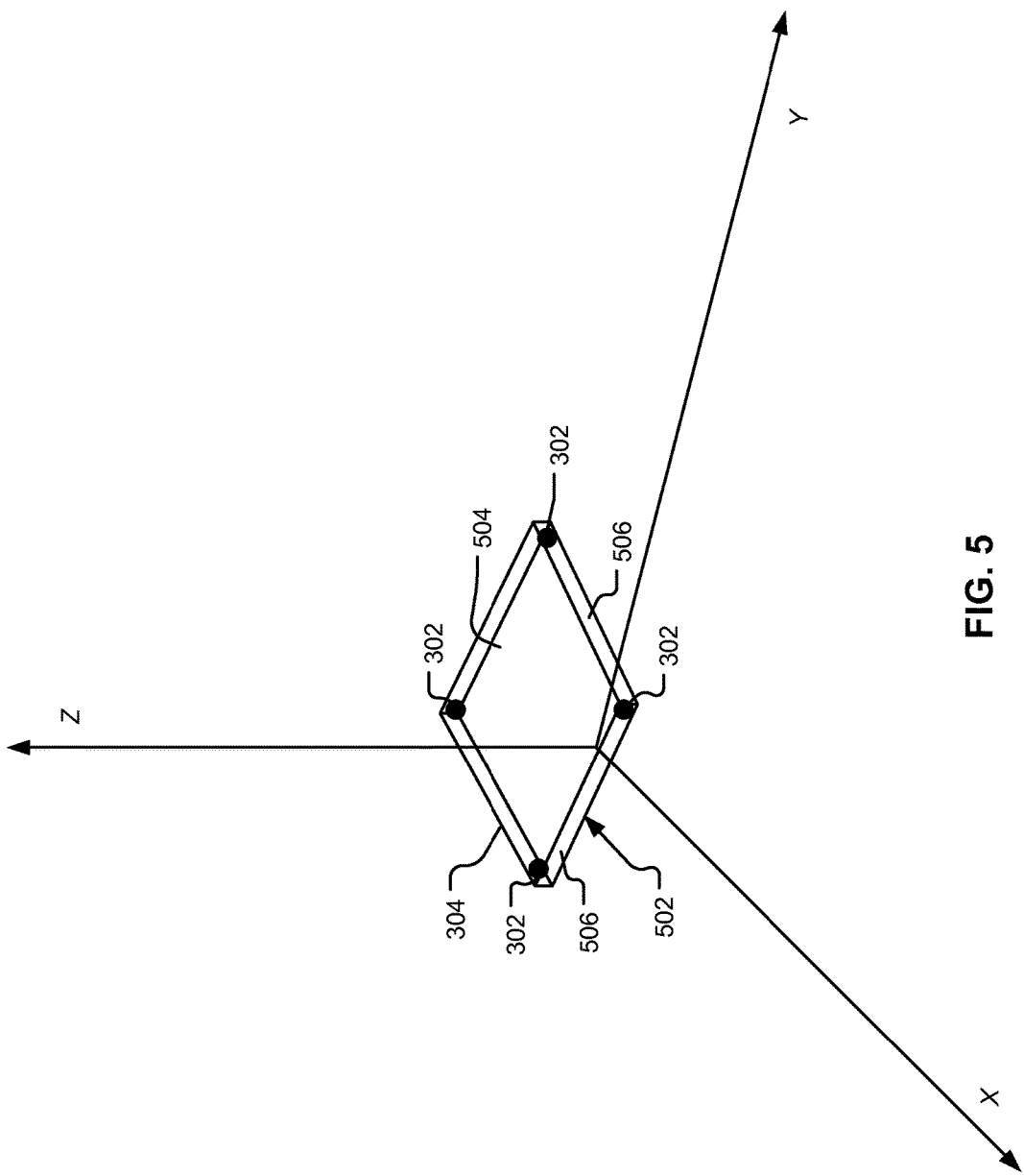
FIG. 5 depicts an image of a data set in a geometric environment having a synthetic camera viewing data points with reference surfaces and one or more reference lines, normal to the one or more reference surfaces intersecting or approaching intersection.

Referring now to FIG. 5 an embodiment can be seen showing operations 218, 220, 222. Data points 302 may be enclosed in a reference prism 502. The reference prism 502 may have multiple faces including a reference face 504 which is a face of the reference prism 502 having an area greater than or equal to the area of the other faces 506 of the reference prism 502.

In this embodiment the planar fit score may be calculated at least by determining whether the reference face 504 has an area which is larger in proportion to the other faces 506 of the reference prism 502. A greater area of the reference face 504 in proportion to the other faces 506 may increase the planar fit score. In an embodiment, the planar fit score may range from a value of zero to one, where zero means there is no fit to the planar control scheme and where one means there is one hundred percent fit to the planar control scheme. The planar confidence score may be calculated at least by determining the number of the data points 302 which are enclosed within the reference prism 504 in proportion to the total number of data points 302. Greater numbers of data points 302 enclosed within the reference prism 502 in proportion to the total number of data points 302 may increase the planar confidence score. In an embodiment, the planar confidence score may range from a value of zero to one, where zero means there is no confidence in the fit and where one means there is one hundred percent confidence.

Figure 6:
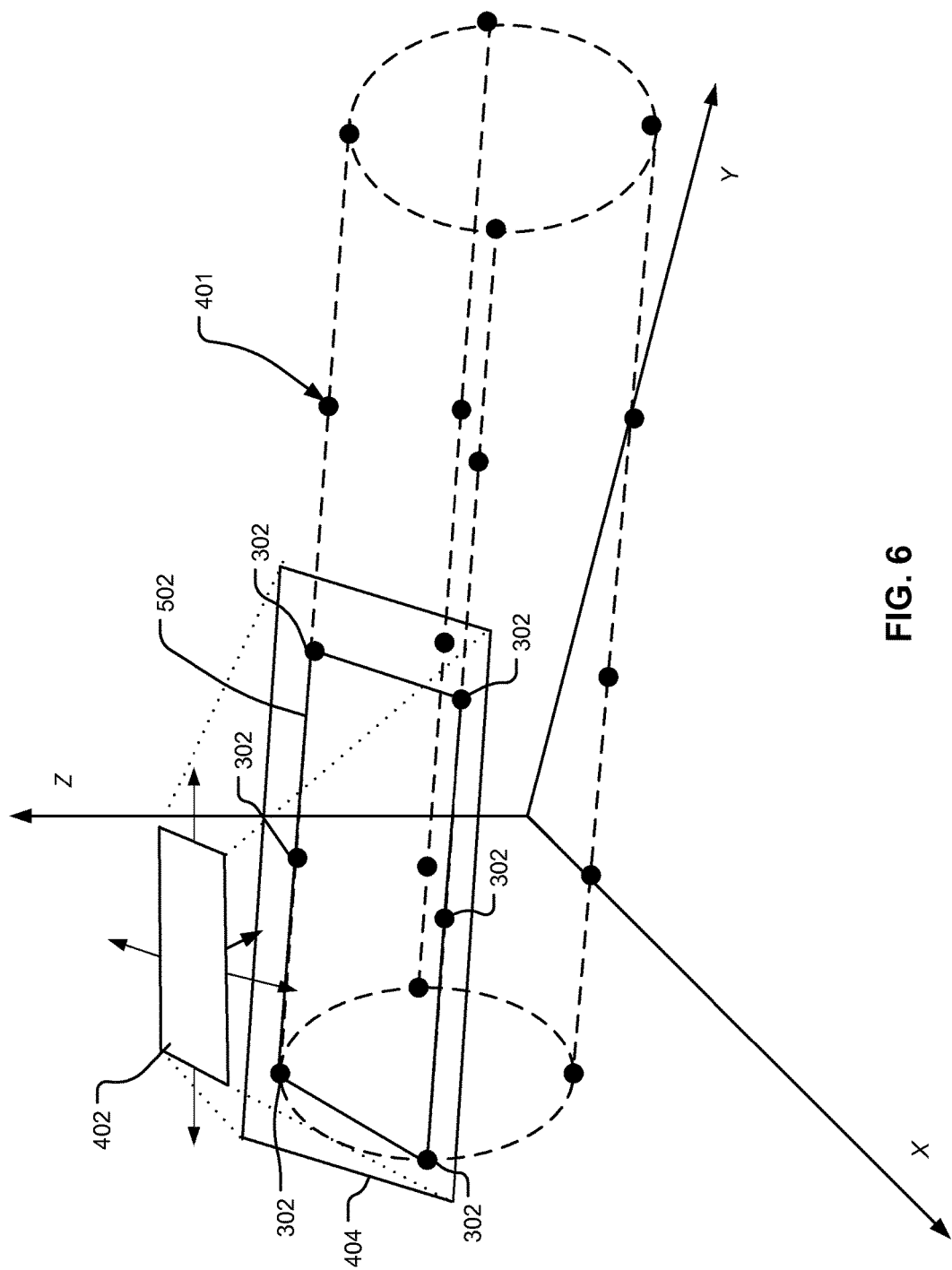
FIG. 6 depicts an image of a data set in a geometric environment having a synthetic camera viewing data points with a reference prism enclosing the data points.

Referring now to FIG. 6, an embodiment of at least operations 218, 220, and 222, calculating the planar fit score and planar confidence score, may be seen. In the embodiment, a data set 401 and a synthetic camera 402 may be seen. The synthetic camera may have a view plane 404 and be oriented such that data points 302 are in view of the synthetic camera 402. The data points 302 in view of the synthetic camera 402 may be captured, and a reference prism 502 may enclose the data points 302. The data points 302 may be automatically captured when in the view plane 404 of the synthetic camera 402. The data points 302 may also be updated in real time to include only the data points 302 which are currently in the view plane 404 of the synthetic camera 402.

In this embodiment, referring to FIGS. 5 and 6, the planar fit score may be calculated in the same or substantially similar manner as in FIG. 5, by at least determining whether the reference face 504 has an area which is larger in proportion to the other faces 506 of the reference prism. However in this embodiment, the calculation of planar fit score and the planar confidence score may be made with regard to only the data points 302 which are in view of the synthetic camera 402.

Figure 7:
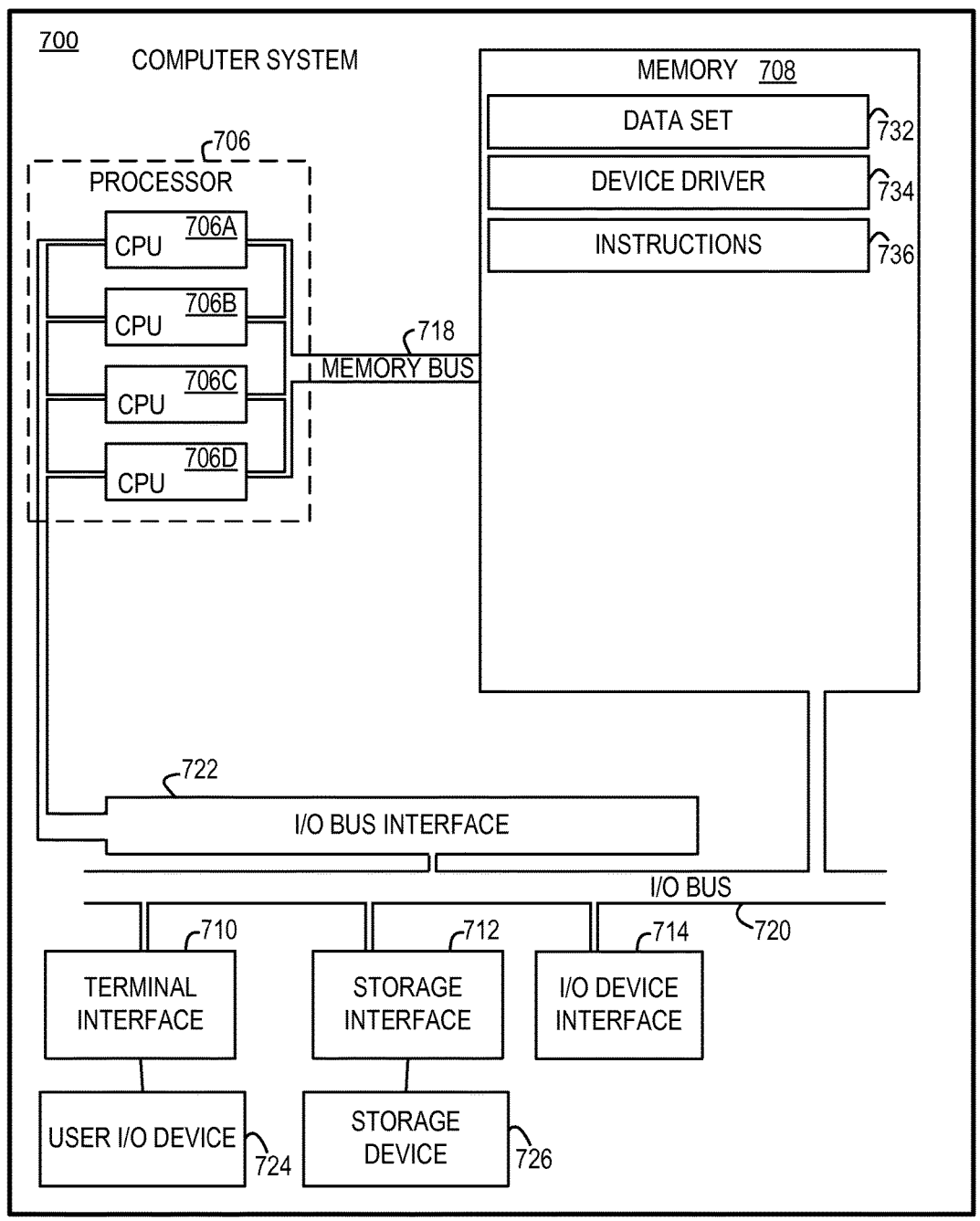
FIG. 7 depicts a block diagram of an exemplary computer system for implementing an embodiment.

FIG. 7 depicts a high-level block diagram representation of a computer system 700, according to an embodiment of the present invention. The terms "server" and "client" are used herein for convenience only, and in various embodiments a computer system that operates as a client computer in one environment may operate as a server computer in another environment, and vice versa. The mechanisms and apparatus of embodiments of the present invention apply equally to other appropriate computing systems, including a computer system that does not employ the client-server model.

The major components of the computer system 700 may include one or more processors 706, a main memory 708, a terminal interface 710, a storage interface 712, and an input/output (I/O) device interface 714, all of which may be communicatively coupled, directly or indirectly, for inter-component communication via a memory bus 718, an I/O bus 720, and an I/O bus interface unit 722.

The computer system 700 may contain one or more general-purpose programmable central processing units (CPUs) 706A, 706B, 706C, and 706D, herein generically referred to as the processor 706. In an embodiment, the computer system 700 may contain multiple processors typical of a relatively large system; however, in another embodiment the computer system 700 may alternatively be a single CPU system. Each processor 706 may execute instructions stored in the main memory 708 and may include one or more levels of on-board cache.

In an embodiment, the main memory 708 may include a random-access semiconductor memory, storage device, or storage medium (either volatile or non-volatile) for storing or encoding data and programs. In another embodiment, the main memory 708 may represent the entire virtual memory of the computer system 700, and may also include the virtual memory of other computer systems coupled to the computer system 700. The main memory 708 may be conceptually a single monolithic entity, but in other embodiments the main memory 708 may be a more complex arrangement, such as a hierarchy of caches and other memory devices.

The main memory 708 may store or encode a data set 732, a device driver 734, and instructions 736, hereafter collectively referred to as "memory elements." Although the memory elements are illustrated as being contained within the main memory 708 in the computer system 700, in other embodiments some or all of them may be on different computer systems and may be accessed remotely, e.g., via a network. The computer system 700 may use virtual addressing mechanisms that allow the programs of the computer system 700 to behave as if they only have access to a large, single storage entity instead of access to multiple, smaller storage entities. Thus, while the memory elements are illustrated as being contained within the main memory 708, these elements are not necessarily completely contained in the same storage device at the same time. Further, although the memory elements are illustrated as being separate entities, in other embodiments some of them, portions of some of them, or all of them may be packaged together.

In an embodiment, the instructions 736 may be instructions or statements that execute on the processor 706 or instructions or statements that may be interpreted by instructions or statements that execute on the processor 706, to carry out the functions as described above with reference to FIGS. 2, 3, 4, 5, and 6. In an embodiment, the instructions may include obtaining the data set 732 for geometric representation on an output device, the data set 732 having data points, forming one or more reference surfaces, the one or more reference surfaces formed such that the reference surfaces have one or more of the data points as vertices, calculating a fit score and a confidence score using one or more of the reference surfaces, and configuring the input device to a control scheme when a computational operation on the fit score and the confidence score is outside of a threshold value.

In another embodiment, the memory elements, or two or more of these elements may be implemented in hardware via semiconductor devices, chips, logical gates, circuits, circuit cards, other physical hardware devices, or a combination of these devices in lieu of, or in addition to, a processor-based system. In an embodiment, the memory elements, or two or more of these elements may include data in addition to instructions or statements.

The memory bus 718 may provide a data communication path for transferring data among the processor 706 and the main memory 708. The I/O bus interface 722 may provide a data communication path for transferring data among the processor 706 and the I/O bus 720. The I/O bus interface 722 may be further coupled to the I/O bus 720 for transferring data to and from the various I/O units. The I/O bus interface unit 722 communicates with multiple I/O interface units 710, 712, 714, and 716, which may also be known as I/O processors (IOPs) or I/O adapters (IOAs), through the I/O bus 720.

The I/O interface units may support communication with a variety of storage and I/O devices. For example, the terminal interface unit 710 may support the attachment of one or more user I/O devices 724, which may include user output devices (such as a video display device, speaker, or television set) and user input devices (such as a keyboard, mouse, keypad, touchpad, trackball, buttons, light pen, or other pointing device). A user may manipulate the user input devices utilizing a user interface, in order to provide input data and commands to the user I/O device 724 and the computer system 700, and may receive output data via the user output devices. For example, a user interface may be presented via the user I/O device 724, such as displayed on a display device, played via a speaker, or printed via a printer.

In an embodiment, the user input devices may be used to control navigation of a synthetic camera in a geometric environment. The input device may be configured to a control scheme. The control scheme may be stored in the main memory or may be accessed remotely, e.g., via a network. In an embodiment, control scheme may be a geometric control scheme. The geometric control scheme may allow for rotation around a center and for zooming towards or away from the center. In an embodiment, a mouse may be used as an input device with a geometric control scheme where a mouse click and drag motion the mouse rotates the synthetic camera view around the center. A scroll wheel on the mouse may be used where the scroll wheel zooms the synthetic camera towards or away from the center.

In another embodiment, a planar control scheme may be used. The planar control scheme may allow for panning movement of the synthetic camera in two dimensions parallel to a plane and may allow for zooming motion towards or away from the plane. In an embodiment, a mouse may be used as an input device with a planar control scheme where a mouse click and drag motion the mouse pans the synthetic camera view in two dimensions parallel to the plane. A scroll wheel on the mouse may be used where the scroll wheel zooms the synthetic camera towards or away from the plane. In another embodiment, a roaming control scheme may be used. The roaming control scheme may allow for free movement of the synthetic camera in three dimensions. A mouse and keyboard may be used as input devices with a roaming control scheme where mouse movement orients the view of the synthetic camera and where key presses directs the synthetic camera in three dimensions in the geometric environment.

The storage interface 712 supports the attachment of one or more disk drives or direct access storage devices 726 (which are typically rotating magnetic disk drive storage devices, although they could alternatively be other storage devices, including arrays of disk drives configured to appear as a single large storage device to a host computer). In another embodiment, the storage device 726 may be implemented via any type of secondary storage device. The contents of the main memory 708, or a portion thereof, may be stored to and retrieved from the storage device 726 as needed. The I/O device interface 714 may provide an interface to any of various other input/output devices or devices of other types, such as printers or fax machines. The DMA controller 716 may provide hardware subsystems within the computer system 700 to access the main memory 708 independently of the central processing unit (CPU).

As will be appreciated by one skilled in the art, aspects of the present invention may be embodied as a system, method, computer program product or computer program. Accordingly, aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc. or any suitable combination of the foregoing.

Computer program code for carrying out operations for aspects of the present invention may be written in any combination of one or more programming languages, including an object oriented programming language such as Java®, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). Java and all Java-based trademarks and logos are trademarks or registered trademarks of Oracle and/or its affiliates.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

For the avoidance of doubt, the term "comprising", as used herein throughout the description and claims is not to be construed as meaning "consisting only of".

The foregoing description of exemplary embodiments of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather determined in view of what would be apparent to those skilled in the art from the description provided herein and the claims appended hereto.

I claim:

1. A computer system comprising:
   a processor;
   an input device for controlling motion of a synthetic camera within a geometric environment;
   an output device for displaying the geometric environment; and
   memory communicatively coupled to the processor, wherein the memory is encoded with instructions, and wherein the instructions when executed on the processor comprise:
   obtaining a plurality of data points incorporated in a data set, the data set being represented in the geometric environment;
   forming a plurality of reference surfaces, the plurality of reference surfaces having different groups of data points of the plurality of data points as their respective vertices;
   forming a plurality of reference lines, each reference line being normal to a corresponding reference surface of the plurality of reference surfaces;
   calculating a geometric fit score based on an extent to which the plurality of reference lines approach a common intersection point with each other;

calculating a geometric confidence score based on a number of the plurality of reference lines;

calculating a result of a computational operation on the geometric fit score and the geometric confidence score;

determining whether the result of the computational operation exceeds a threshold; and configuring, if the result of the computational operation exceeds the threshold, the input device to a geometric control scheme, wherein the geometric control scheme enables rotation of the synthetic camera about the plurality of data points.

2. The computer system of claim 1, wherein the obtaining the plurality of data points includes capturing the plurality of data points in view of the synthetic camera.

3. The computer system of claim 1, wherein the plurality of reference surfaces comprise a plurality of triangular reference surfaces, and wherein the different groups of data points of the plurality of data points comprise different groups of three data points of the plurality of data points.

4. The computer system of claim 3, wherein each reference line being normal to a corresponding reference surface of the plurality of reference surfaces comprises each reference line being normal to a center of a corresponding triangular reference surface of the plurality of triangular reference surfaces.

5. The computer system of claim 1, wherein the enabled rotation about the plurality of data points includes the common intersection point as a center of rotation.

6. The computer system of claim 1, wherein, while the input device is configured to the geometric control scheme, variations in directions and magnitudes of rotations of the synthetic camera about the plurality of data points are dependent upon variations among user inputs into the input device.

7. The computer system of claim 1, wherein the instructions further comprise:

calculating, if the result of the computational operation does not exceed the threshold, a planar fit score based on an extent to which the plurality of data points are located approximately on a common plane with each other;

calculating a planar confidence score based on a number of the plurality of data points;

calculating a result of a second computational operation on the planar fit score and the planar confidence score;

determining whether the result of the second computational operation exceeds the threshold; and configuring, if the result of the second computational operation exceeds the threshold, the input device to a planar control scheme, wherein the planar control scheme enables panning of the synthetic camera over the plurality of data points in two dimensions parallel to the common plane.

8. The computer system of claim 7, wherein the instructions further comprise:

configuring, if the result of the second computational operation does not exceed the threshold, the input device to a roaming control scheme, wherein the roaming control scheme enables free movement of the synthetic camera in three dimensions relative to the plurality of data points.

9. The computer system of claim 8, wherein the geometric control scheme, the planar control scheme, and the roaming control scheme each define a different set of motions that a user manipulating the input device can make the synthetic camera perform.

10. The computer system of claim 7, wherein the geometric control scheme further enables zooming of the synthetic camera towards or away from the plurality of data points, wherein the geometric control scheme does not enable panning of the synthetic camera over the plurality of data points in two dimensions parallel to the common plane, wherein the planar control scheme further enables zooming of the synthetic camera towards or away from the plurality of data points, and wherein the planar control scheme does not enable rotation of the synthetic camera about the plurality of data points.

11. The computer system of claim 8, wherein the input device includes a combination of a keyboard and a mouse with a scroll wheel, wherein, while the input device is configured to the geometric control scheme, click and drag motions of the mouse by a user cause rotations of the synthetic camera about the plurality of data points and scrolling motions of the mouse scroll wheel by the user cause zooming of the synthetic camera towards or away from the plurality of data points, wherein, while the input device is configured to the planar control scheme, the click and drag motions of the mouse by the user cause pans of the synthetic camera over the plurality of data points in two dimensions parallel to the common plane and the scrolling motions of the mouse scroll wheel by the user cause the zooming of the synthetic camera towards or away from the plurality of data points, and wherein, while the input device is configured to the roaming control scheme, movements of the mouse by the user cause changes in orientation of the synthetic camera and key presses into the keyboard by the user moves the synthetic camera in three dimensions relative to the plurality of data points.

12. The computer system of claim 7, wherein, while the input device is configured to the geometric control scheme, a first user input into the input device causes a first rotation of the synthetic camera about the plurality of data points, and wherein, while the input device is configured to the planar control scheme, the first user input into the input device causes, rather than the first rotation, a first pan of the synthetic camera over the plurality of data points in a direction parallel to the common plane.

* * * * *